UNITED STATES PATENT OFFICE.

STEPHEN M. ALLEN, OF WOBURN, MASSACHUSETTS.

IMPROVEMENT IN THE MANUFACTURE OF WATER-PROOF PAPER.

Specification forming part of Letters Patent No. 53,094, dated March 13, 1866.

*To all whom it may concern:*

Be it known that I, STEPHEN M. ALLEN, of Woburn, in the county of Middlesex and State of Massachusetts, have invented a new and Improved Method of Making a Strong and Water-Proof Paper which may be used for many useful purposes, such as a protection against water, for linings, casings, &c., and, when japanned or printed in colors and varnished, for certain purposes of upholstering, as well as for mats, carpet and table covers, car-linings, stair-coverings, &c., and when prepared specially for the purpose it will constitute a good substitute for parchment, of which the following is a specification.

To enable others to make and use my invention, I will now proceed to describe the manner in which the same is or may be carried into effect.

For making the pulp I usually use vegetable fibrous substances which are well charged with albumen and gluten, and sometimes I add animal fiber by pulping scraps of untanned skins with the vegetable fiber, so that the resinous and gelatinous properties of both the animal and vegetable fibers may be well mixed, and form, by their chemical affinities, a sheet more or less water-proof. To this effect I prefer to take flax, hemp, or China grass, or some other fiber possessing a large amount of resinous or glutinous matter, which as a general thing, though not always, is used before rotting or fermenting, and I pulp the same, when properly cleansed, in an ordinary paper-pulping machine. To this vegetable fibrous substance I add an amount (more or less, according to circumstances) of the scraps of untanned hides and grind them together. Sometimes and for some purposes, when the vegetable is rich in albuminous matter, I dispensed with the animal fiber, though for many purposes it is indispensable. I sometimes add to the animal and vegetable fiber while being pulped other gelatinous or resinous substances when a perfect water-proof paper is wanted. When the fibers are properly mixed it is diluted and run off on an ordinary paper-machine in sheets and dried, when they may be enameled, printed, or varnished to suit the demands of the specific article desired to be made from them.

Having thus described my invention, I claim—

1. A pulp and paper made from vegetable fibrous substances in which the original resinous or albuminous matter is retained, with or without the addition of foreign resinous or gelatinous substances, substantially as set forth.

2. A pulp and paper made from vegetable fiber containing a large proportion of its natural gum when pulped, in combination with pulped untanned animal fiber, and this whether mixed or not with other foreign resinous or gelatinous substances, as set forth.

3. The printing, enameling, or glazing, or varnishing of a paper prepared in the manner and having the properties herein described.

In testimony whereof I have signed my name to this specification before two subscribing witnesses.

STEPHEN M. ALLEN.

Witnesses:
WM. W. GILBERT,
GEORGE H. POLLOCK.